July 6, 1954   O. L. OTTOSSON   2,683,080
APPARATUS FOR GROWING CRYSTALS
Filed Dec. 9, 1949

INVENTOR.
Olof Lorentz Ottosson
BY
Glascock, Downing & Seebold,
Attorneys.

Patented July 6, 1954

2,683,080

UNITED STATES PATENT OFFICE 2,683,080

APPARATUS FOR GROWING CRYSTALS

Olof Lorentz Ottosson, Stockholm, Sweden, assignor to Telefonaktiebolaget L M Ericsson, Stockholm, Sweden, a company of Sweden Application December 9, 1949, Serial No. 132,105

Claims priority, application Sweden December 11, 1948

8 Claims. (Cl. 23—273)

The present invention relates to a method and apparatus for producing and maintaining a supersaturated solution having a high degree of saturation of a solid substance in a fluid solvent through circulation of the solution.

The invention particularly relates to a method and apparatus of the above type in which seed crystals are added to the supersaturated solution to dissolve out the substance and new substance is continuously supplied by dissolution during circulation.

The operation of the process and apparatus is predicated mainly on the fact, that as the specific gravity of the solid substance in a pure condition is higher than the specific gravity of the solvent, an increase in the degree of concentration of the solution will effect an increase of the specific gravity of the solution. A contributive factor resides in the fact that the specific gravity of the solution is diminished as the volume thereof increases when the temperature of the solution is raised. Further the method is based on the fact, that the solubility increases with the rise in temperature.

For a clear understanding of the mode of operation of the invention an embodiment utilizing a solution of a salt in water for the production of large single crystals for piezoelectric or optical use will be described hereinafter.

Crystals of this kind are produced by means of a supersaturated solution of the said solid substance, whereby seed crystals immersed in the solution grow through the crystallization of the substance.

The invention will be referred to hereinafter with reference to the accompanying drawings in which.

Figure 1:
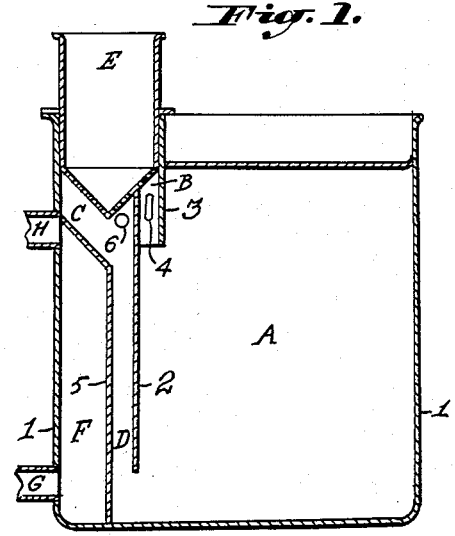
Figure 1 is a sectional view illustrating an apparatus for carrying out the process.

The device consists of a vessel 1, in which a vertical channel system has been arranged. The vessel is filled with the mentioned liquid.

The principal part of the vessel consists of a part A, in which the intended process, for example a crystallization, may take place. This part is hereinafter referred to as crystallizer chamber. It is bordered—besides by the bottom and three sides of the vessel 1—on one side by a vertical wall or partition 2, which is inserted so, that a passage is left between the lower edge of the wall 2 and the bottom of the vessel. The top of the wall 2 terminates at some distance beneath the upper edge of the vessel and beneath the liquid level therein, so that an opening is left between the upper edge of the wall 2 and the fluid surface whereby the solution can circulate over the top of wall 2. In spaced parallelism with the wall 2 there is disposed a plate 3 placed towards the interior of the crystallizer chamber A and extending from the top of the vessel 1 downwardly and terminating below the upper edge or top of wall 2, so that a short, vertical channel B is formed, which communicates at its lower end with the crystallizer chamber and at its upper end with and through the opening above the top of wall 2. In this channel a heater 4 is placed.

Between the wall 2 and the side of the vessel another wall 5 is arranged, which at its upper part bends out towards the side of the vessel and is connected with the same, so that a cavity or chamber F is formed. This cavity is provided with openings, at the top and bottom thereof through which a cooling-medium is circulated from the inlet opening G up through F and out through the outlet opening H. The walls 2 and 5 define a vertical channel D, which at the bottom communicates with the crystallizer chamber and at the top widens to define a chamber C, hereinafter referred to as the dissolver chamber, which through the channel B communicates with the crystallizer chamber. In this manner a closed, ring-shaped circulatory system is provided.

The lower part of a container E, which is perforated from the bottom up to the fluid surface or level, is immersed in the dissolver chamber C, so that one side of the container rests against the upper edge of the wall 2. Thus the fluid is forced to pass through the lower part of the container E when moving from the channel B through chamber C to the channel D. The container E is filled with that substance with which the liquid is to be supersaturated.

In the dissolver chamber C immediately beneath the container E there is a thermosensitive device 6, for example a contact thermometer, by means of which the effect of the heater 4 may be regulated.

The crystallizer vessel 1 is assumed to be filled up to a suitable level above the top of wall 2 with an almost saturated solution of the said substance.

In the crystallizer chamber A the temperature $T_0$ is prevailing. The temperature of the solution in the channel B is now raised by the heater 4 to the temperature $T_1$, whereby the solution circulates and passes into contact with the substance in that part of the container E, which is immersed in the liquid in dissolver chamber C.

As the solution then is unsaturated, a certain quantity of salt is dissolved. This process requires heat and accordingly the solution becomes cooler when passing through E and the temperature is decreased to $T_2$. The solution in circulation leaves C with this temperature and is approximately saturated.

Because the circulating portion of the solution is now more concentrated than in B and thus heavier, it will pass down through the channel D, whereby it is successively cooled to the temperature $T_0$ by the cooling water or fluid in chamber F, i. e. the same temperature as in the crystallizer vessel. The solution has become supersaturated through the temperature drop $T_2-T_0$ and returns in this condition to the crystallizer chamber A, where it spreads out in a horizontal layer beneath the unsaturated solution.

The circulation however continues in the same manner and a continuous flow of supersaturated solution enters the crystallizer vessel. This is filled more and more with supersaturated solution and the boundary layer between the supersaturated solution and the unsaturated portion of solution rises slowly upwards.

This action continues until the supersaturated solution reaches that level, at which it begins to pass up into the channel B. As it thereby is still almost saturated after being heated to $T_1$, therefore only a small quantity of new salt is dissolved and enters into solution since the temperature drop on the way through the container E having the salt therein will be negligible, and the temperature $T_2$ in chamber C tends to rise. The thermosensitive device in chamber C thereby reduces the effect in the heater 4, thus temperature $T_1$ is dropping and equilibrium is achieved when $T_1=T_2$. Then the circulation stops and only so much heat is developed that the temperature is held constant.

The saturation degree is proportional to the temperature difference, which is maintained between the dissolver chamber C and the crystallizer chamber A and may be regulated, for example by adjusting the thermosensitive device to different values of $T_2$, when $T_0$ is held constant.

When the substance is precipitated in the crystallizer chamber A, for example by immersing seed crystals, the concentration will decrease, when crystallization takes place. The solution then existing will then rise up to the fluid surface in the crystallizer vessel, pass into channel B, and then heated up to $T_1$. It is then unsaturated, and salt is dissolved in outer vessel E, the temperature drop is effected and the thermosensitive device increases the heat supply from heater 4. The circulation starts and continues, as long as an unsaturated solution is obtained after the heating in channel B. If larger quantities of salt are precipitating, the difference between $T_1$ and $T_2$ will be greater, and because $T_2$ is held constant, $T_1$ will increase. This in turn effects an increased rate of dissolutions. The apparatus thus tends to hold the rate of dissolution as great as the rate of crystallization, so that the saturation degree is held constant.

Figure 2:
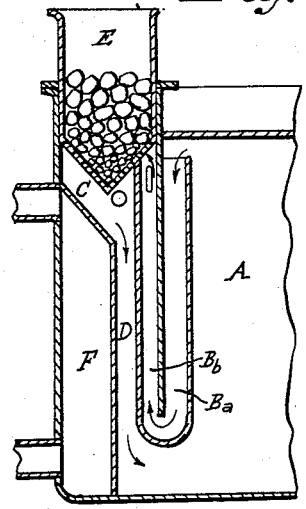
Figure 2 is a partial sectional view of a modification of the apparatus shown in Figure 1.

A modification of the above described apparatus consists for example in providing that a prolongation of the lower part of the wall 2 which is bent upwards and may extend toward and terminate a distance beneath the fluid surface, as is shown in Fig. 2. By lengthening the plate 3 downwards according to the figure the channel B is first caused to pass from the opening in communication with the crystallizer chamber A, extends perpendicularly down towards the bottom leg Ba, Fig. 2 and then upwardly along the wall 2 up towards and communicates with the dissolver chamber C, leg Bb, Fig. 2.

In that part Bb of the channel B, where the solution rises upwards, it will be heated successively by the solution coming from the dissolver chamber C and passing through channel D, which latter solution thus is cooled. Thus the moment acting against the circulation direction will be partly compensated, which moment is due to the fact that the solution in channel D is warmer than that in the crystallizer chamber. Even very small concentration differences are thus sufficient to maintain the circulation. This fact has turned out to be of great importance for crystal growing utilizing substances, which are difficult to dissolve.

Figure 3:
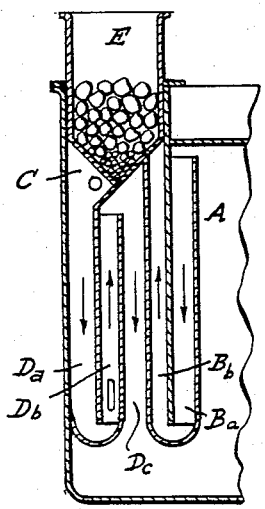
Figures 3 and 4 are partial sectional views illustrating other embodiments of the invention.

Due to the heat exchange obtained between the channels B and D the need of an especially arranged cooling chamber is reduced. This heat exchange can however also be utilized to gain other advantages. This is shown in the modification of Fig. 3, where the channel D has been modified in such a way that it includes a leg Da extending downwards from the dissolver chamber E, then a leg Db rising upwards and finally another leg Dc passing downwards and along the wall of the channel Bb. A heater is installed in the ascending part or leg Db of the channel. The channel leg Db is the warmest part of the fluid system. As the solution has already passed the salt container E, the temperature can be held so high that the solution will be rather unsaturated, whereby possible grains of salt coming from the salt container E will be completely dissolved and a homogeneous solution obtained. Further so much heat may be supplied to the solution in the channel Bb that it suffices to compensate the dissolution heat, whereby no heater has to be placed in Bb. The circulation in this device is rather strong.

Figure 4:
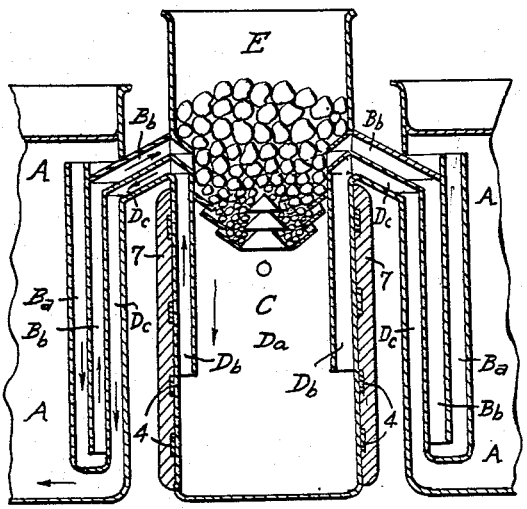

Figure 4 illustrates another modification suitable for growing crystals on a larger scale. The dissolver chamber in this form constitutes a separate vessel which is connected with a plurality of crystallizer vessels A respectively appearing on the right and left hand sides of the vessel. The channel providing communication between the crystallizer vessels and the dissolver chamber includes a downward leg Ba and an upward leg Bb similar to the arrangement of Figure 2, since the return channel providing communication between the dissolver chamber and the crystallizer chamber includes in part the wall of the dissolver chamber which accommodates the upward extending leg Db of this latter channel. The heater 4 may comprise a resistance coil wound round the dissolver chamber and provided with a heat insulating coating 7 of any suitable type. As indicated, the thermosensitive device is disposed in the dissolver chamber subjacent the perforated bottom of the salt container E. In this modification the solution circulates from chamber A down through leg Ba up through leg Bb into the upper portion of dissolver chamber and over the salt present therein. The supersaturated portion of the solution flows upwardly through legs Db and then downwardly through leg Dc into the lower portion of the crystallizer chambers A.

The method may be used also for other purposes than crystal growing and the invention comprises the same independent of applications and devices for its application in accordance with the following claims.

I claim:

1. Apparatus for growing salt crystals by producing and maintaining a supersaturated solution of a solid in a liquid by circulation of the solution while the solid passes out of solution through crystallization, comprising wall means and bottom means defining a dissolver chamber and at least one laterally adjacent crystallizer chamber, a salt container having an upper portion and a perforated lower portion, said perforated lower portion being disposed within the upper part of the dissolver chamber, conduit means constituted in part by said wall means and providing communication between the chambers, said conduit means including opposite ends disposed beneath the upper portion of the salt container, said conduit means further including a first channel having at least one substantially vertical portion terminating in an outlet in communication with the lower portion of the crystallizer chamber, said first channel having an inlet in the dissolver chamber, further conduit means providing a second channel having an inlet in the crytallizer chamber at a level at least adjacent the level of the lower portion of the salt container, said second channel including a vertical portion contiguous with the vertical portion of the first channel, said second channel having an outlet in direct communication with the perforated lower portion of the salt container, both said channels having a common wall at least adjacent the perforated lower portion of the salt container, heating means associated with the vertical portion of one of the channels for heating solution flowing therethrough so that the portion of solution in the dissolver chamber below the solids container and thereby of greater concentration flows into the lower portion of the crystallizer chamber and the portion of solution in the upper part of the crystallizer chamber flows through said second mentioned channel through the perforated portion of the salt container whereby the concentration of the last mentioned portion of solution is increased and a closed flow circuit for chamber to chamber is established until the solution in the crystallizer chamber is supersaturated, said heating means being in a channel portion in which the solution flows upwardly.

2. Apparatus for growing salt crystals comprising wall means and a bottom defining a vessel adapted to contain liquid, a salt container having a perforated lower portion disposed in the top of the vessel, a vertically disposed partition means within the vessel and defining in conjunction therewith a combined dissolving chamber and an underlying vertical outlet channel, said partition means terminating at its upper end adjacent the perforated lower portion of the salt container and being spaced from the said bottom, said salt container having at least part of its perforated lower portion disposed in the top of the dissolving chamber, additional partition means above the bottom, spaced laterally of said first mentioned partition means and including a portion extending above the perforated portion of the salt container, said additional partition means cooperating with said first mentioned partition means to define at least one vertical channel means constituting an inlet channel to the dissolving chamber, said second mentioned channel having a liquid inlet adjacent the level of the perforated lower portion of the salt container and an outlet underlying at least a portion of the perforated lower portion of said salt container and heating means positioned in the inlet channel adjacent the portion of the perforated portion of the salt container underlying the outlet for warming solution passing through the inlet channel to establish continuous circulation of liquid through the channels and the part of the perforated lower portion of the salt container disposed in the dissolving chamber until the liquid exteriorly of the channels is supersaturated.

3. Apparatus for growing salt crystals as defined in and by claim 2, in which the first mentioned partition means includes spaced walls and an upwardly curved portion connecting the walls, said second partition means lying between said walls and terminating at its lower end above the upwardly curved portion and defining in conjunction with the first partition means an inlet channel for the dissolving chamber having a liquid inlet at least adjacent the level of the perforated lower portion of the salt container, a first portion extending downwardly toward the bottom and a second portion extending upwardly toward the salt container and terminating in an outlet underlying at least a portion of the immersed part of the salt container.

4. Apparatus for growing salt crystals as defined in and by claim 3, in which the heating means is disposed in the second portion of the inlet channel.

5. Apparatus for growing salt crystals as defined in and by claim 4, in which cooling means are associated with the outlet channel.

6. Apparatus for growing salt crystals as defined in and by claim 2, and heat exchange means for receiving a cooling fluid mounted in heat exchange relationship with said vertical outlet channel.

7. Apparatus for growing salt crystals as defined in and by claim 6, in which the heat exchange means include a wall cooperating with said first mentioned partition means to define the dissolving chamber and vertical outlet channel, said wall including an upper portion diverging away from said partition means to provide a zone of increased cross-sectional area, said zone constituting the dissolving chamber.

8. Apparatus for growing salt crystals as claimed in claim 2, in which said first mentioned partition means is a single wall terminating above the bottom, and said second partition means is a single wall parallel therewith and extending from above the perforated lower portion of the salt container downwardly therefrom and terminating beneath and adjacent the lowermost part of the perforated portion of the salt container so that said inlet channel is short as compared with said outlet channel.

References Cited in the file of this patent

UNITED STATES PATENTS

| Number | Name | Date |
| --- | --- | --- |
| 1,063,707 | Lummas | June 3, 1913 |
| 2,204,180 | Gerlach | June 11, 1940 |
| 2,459,869 | Christensen et al. | Jan. 25, 1949 |
| 2,562,325 | Merritt | July 31, 1951 |
| 2,584,910 | Ohlwiler | Feb. 5, 1952 |

FOREIGN PATENTS

| Number | Country | Date |
| --- | --- | --- |
| 930,077 | France | Jan. 15, 1948 |

OTHER REFERENCES

Handbuch der Arbeitsmethoden in der anorganischen Chemie, Band IV, Tiede and Richter, published by Walter de Gruyter and Co., Berlin and Leipzig, 1926, page 459.

Comptes Rendus, vol. 226, May 31, 1948, pages 1823–1825.